US011068749B1

(12) United States Patent
Perincherry et al.

(10) Patent No.: US 11,068,749 B1
(45) Date of Patent: Jul. 20, 2021

(54) RCCC TO RGB DOMAIN TRANSLATION WITH DEEP NEURAL NETWORKS

(71) Applicant: Ford Global Technologies, LLC, Dearborn, MI (US)

(72) Inventors: Akhil Perincherry, Mountain View, CA (US); Kyoung Min Lee, Ypsilanti, MI (US); Ishan Patel, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 47 days.

(21) Appl. No.: 16/799,258

(22) Filed: Feb. 24, 2020

(51) Int. Cl.
*G06K 9/00* (2006.01)
*G06K 9/62* (2006.01)
*G06K 9/46* (2006.01)

(52) U.S. Cl.
CPC ......... *G06K 9/6262* (2013.01); *G06K 9/4652* (2013.01); *G06K 9/6202* (2013.01)

(58) Field of Classification Search
CPC ... G06K 9/6262; G06K 9/4652; G06K 9/6202
USPC ....................................................... 382/157
See application file for complete search history.

(56) References Cited

U.S. PATENT DOCUMENTS

2019/0266418 A1    8/2019    Xu et al.

FOREIGN PATENT DOCUMENTS

| AU | 2018100325 A4 | 4/2018 |
|---|---|---|
| CN | 108389168 A | 8/2018 |
| CN | 108711138 A | 10/2018 |

OTHER PUBLICATIONS

Ghorban, Farzin, et al. "Conditional multichannel generative adversarial networks with an application to traffic signs representation learning." Progress in Artificial Intelligence 8.1 (2019): 73-82. (Year: 2019).*
McCloskey, Scott, and Michael Albright. "Detecting GAN-generated imagery using saturation cues." 2019 IEEE International Conference on Image Processing (ICIP). IEEE, 2019. (Year: 2019).*

* cited by examiner

*Primary Examiner* — Jonathan S Lee
(74) *Attorney, Agent, or Firm* — Frank A. Mackenzie; Bejin Bieneman PLC

(57) ABSTRACT

The present disclosure discloses a system and a method for translating, e.g., mapping, a Red-Clear-Clear-Clear (RCCC) image to a Red-Green-Blue (RGB) image. In an example implementation, the system and the method can receive, at a deep neural network, an image having a Red-Clear-Clear-Clear (RCCC) image pattern, wherein the deep neural network includes a generator and a discriminator; generate, at the generator, a Red-Green-Blue (RGB) image based on the image having the RCCC image pattern; determine, at the discriminator, whether the RGB image is machine-generated or is sourced from the real data distribution; and update at least one weight of the generator when the discriminator determines the RGB image is machine-generated.

20 Claims, 6 Drawing Sheets

US 11,068,749 B1

RCCC TO RGB DOMAIN TRANSLATION WITH DEEP NEURAL NETWORKS

BACKGROUND

Deep neural networks (DNNs) can be used to perform many image understanding tasks, including classification, segmentation, and captioning. Typically, DNNs require large amounts of training images (tens of thousands to millions). Additionally, these training images typically need to be annotated for the purposes of training and prediction.

DETAILED DESCRIPTION

Figure 1:
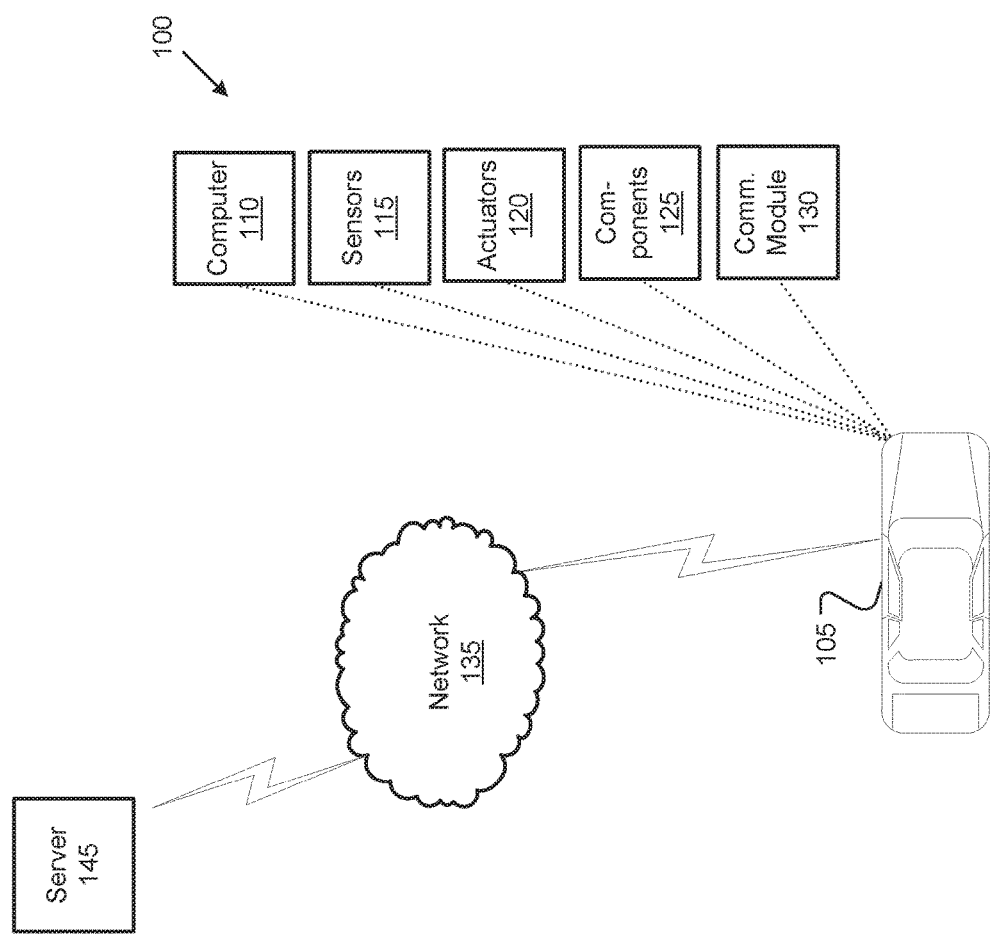
FIG. 1 is a diagram of an example system for training an adversarial network.

A system comprises a computer including a processor and a memory, and the memory including instructions such that the processor is programmed to receive, at a deep neural network, an image having an Red-Clear-Clear-Clear (RCCC) image pattern, wherein the deep neural network includes a generator and a discriminator; generate, at the generator, a Red-Green-Blue (RGB) image based on the image having the RCCC image pattern; determine, at the discriminator, whether the RGB image is machine-generated or is sourced from the real data distribution; and update at least one weight of the generator when the discriminator determines the RGB image is machine-generated.

In other features, the at least one weight is updated based on a spatial relationship comparison between the image having the RCCC image pattern and the generated RGB image.

In other features, the processor is further programmed to generate a plurality of instance segmentation labels based on the image having the RCCC image pattern and generate a plurality of instance segmentation labels based on the generated RGB image.

In other features, the processor is further programmed to: compare at least one instance segmentation label of the plurality of instance segmentation labels of the image having the RCCC image pattern to at least one instance segmentation label of the plurality of instance segmentation labels of the generated RGB image; and determine a difference at least one instance segmentation label of the image having the RCCC image pattern and the at least one instance segmentation label of the RGB image.

In other features, the processor is further programmed to update the at least one weight when the difference is greater than a predetermined spatial relation threshold.

In other features, the at least one weight is updated based on a comparison of a pixel distribution corresponding to the image having the RCCC image pattern to a pixel distribution of a grayscale image corresponding to the generated RGB image.

In other features, the at least one weight is updated based on a comparison of a luminance value corresponding to the image having the RCCC image pattern to a luminance value corresponding to the generated RGB image.

A system comprises a computer including a processor and a memory, the memory including instructions such that the processor is programmed to: receive, at a deep neural network, an image having a Red-Clear-Clear-Clear (RCCC) image pattern, wherein the deep neural network includes a generator and a discriminator; generate, at the generator, a Red-Green-Blue (RGB) image based on the image having the RCCC image pattern; determine, at the discriminator, whether the RGB image is machine-generated or is sourced from the real data distribution; and update at least one weight of the generator when the discriminator determines the RGB image is machine-generated, wherein the at least one weight is updated based on a spatial relationship comparison between the RCCC image and the generated RGB image.

In other features, the processor is further programmed to generate a plurality of instance segmentation labels based on the RCCC image and generate a plurality of instance segmentation labels based on the generated RGB image.

In other features, the processor is further programmed to: compare at least one instance segmentation label of the plurality of instance segmentation labels of the image having the RCCC image pattern to at least one instance segmentation label of the plurality of instance segmentation labels of the generated RGB image; and determine a difference at least one instance segmentation label of the image having the RCCC image pattern and the at least one instance segmentation label of the RGB image.

In other features, the processor is further programmed to update the at least one weight when the difference is greater than a predetermined spatial relation threshold.

In other features, the at least one weight is updated based on a comparison of a pixel distribution corresponding to the image having the RCCC image pattern to a pixel distribution of a grayscale image corresponding to the generated RGB image.

In other features, the at least one weight is updated based on a comparison of a luminance value corresponding to the image having the RCCC image pattern to a luminance value corresponding to the generated RGB image.

In other features, the at least one weight is updated based on a comparison of a pixel distribution corresponding to the image having the RCCC image pattern to a pixel distribution of a RGB image included in a real-world dataset.

A method includes receiving, at a deep neural network, an image having a Red-Clear-Clear-Clear (RCCC) image pattern, wherein the deep neural network includes a generator and a discriminator; generating, at the generator, a Red-Green-Blue (RGB) image based on the image having the RCCC image pattern; determining, at the discriminator, whether the RGB image is machine-generated or is sourced from the real data distribution; and updating at least one weight of the generator when the discriminator determines the RGB image is machine-generated.

In other features, the at least one weight is updated based on a spatial relationship comparison between the image having the RCCC image pattern and the generated RGB image.

In other features, the method includes generating a plurality of instance segmentation labels based on the image having the RCCC image pattern and generate a plurality of instance segmentation labels based on the generated RGB image.

In other features, the method includes comparing at least one instance segmentation label of the plurality of instance segmentation labels of the image having the RCCC image pattern to at least one instance segmentation label of the plurality of instance segmentation labels of the generated RGB image; and determining a difference at least one instance segmentation label of the image having the RCCC image pattern and the at least one instance segmentation label of the RGB image.

In other features, the at least one weight is updated based on a comparison of a pixel distribution corresponding to the image having the RCCC image pattern to a pixel distribution of a grayscale image corresponding to the generated RGB image.

In other features, the at least one weight is updated based on a comparison of a luminance value corresponding to the image having the RCCC image pattern to a luminance value corresponding to the generated RGB image.

Cameras, such as forward-facing vehicle cameras, may generate images having a red-clear-clear-clear (RCCC) image pattern. However, images having the RCCC image pattern do not include the same information as red-green-blue (RGB) images. As used herein, a RCCC image refers to an image having the RCCC image pattern. As a result, converting RCCC images to RGB images may not occur with high fidelity since there is a lack of information regarding which pixels are more green or blue in an RCCC image.

Typically, standard deep neural networks (DNNs) are pre-trained with the ImageNet dataset, which include RGB images. Differences in distributions between the RGB images used in training and the RCCC images in test set can cause divergence when inference on the DNN is run with an RCCC image.

Thus, standard deep neural networks (DNNs) developed for various perception applications do not work as well with RCCC images and, as a result, requires further processing of the image.

The present disclosure discloses an adversarial neural network that trains a generator to translate, e.g., generate, map, etc., a RCCC image to a Red-Green-Blue (RGB) image. As discussed herein, the adversarial neural network can include the generator and a discriminator. The generator generates an RGB image based on an RCCC image, and the discriminator determines whether a received RGB image is machine-generated or sourced from a real data distribution. Based on the determination, one or more weights of the generator can be updated according to a loss function of the adversarial neural network. It is understood that an RCCC image may be converted to a corresponding image having a Clear-Clear-Clear-Clear image pattern, i.e., a CCCC image or luminance image. Thus, the terms RCCC image and CCCC image may be used interchangeably throughout the present disclosure.

While the present disclosure describes a vehicle system and a server, it is understood that any suitable computer system may be used to perform the techniques and/or the functionality of the adversarial neural network described herein. Additionally, the techniques described herein may include training a generator for image generating purposes, which can result in improved processing efficiencies within vehicle systems.

FIG. 1 is a block diagram of an example vehicle system 100. The system 100 includes a vehicle 105, which is a land vehicle such as a car, truck, etc. The vehicle 105 includes a computer 110, vehicle sensors 115, actuators 120 to actuate various vehicle components 125, and a vehicle communications module 130. Via a network 135, the communications module 130 allows the computer 110 to communicate with a server 145.

The computer 110 includes a processor and a memory. The memory includes one or more forms of computer-readable media, and stores instructions executable by the computer 110 for performing various operations, including as disclosed herein.

The computer 110 may operate a vehicle 105 in an autonomous, a semi-autonomous mode, or a non-autonomous (manual) mode. For purposes of this disclosure, an autonomous mode is defined as one in which each of vehicle 105 propulsion, braking, and steering are controlled by the computer 110; in a semi-autonomous mode the computer 110 controls one or two of vehicles 105 propulsion, braking, and steering; in a non-autonomous mode a human operator controls each of vehicle 105 propulsion, braking, and steering.

The computer 110 may include programming to operate one or more of vehicle 105 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via the vehicle 105 communications module 130 as described further below, more than one processor, e.g., included in electronic controller units (ECUs) or the like included in the vehicle 105 for monitoring and/or controlling various vehicle components 125, e.g., a powertrain controller, a brake controller, a steering controller, etc. Further, the computer 110 may communicate, via the vehicle 105 communications module 130, with a navigation system that uses the Global Position System (GPS). As an example, the computer 110 may request and receive location data of the vehicle 105. The location data may be in a known form, e.g., geo-coordinates (latitudinal and longitudinal coordinates).

The computer 110 is generally arranged for communications on the vehicle 105 communications module 130 and also with a vehicle 105 internal wired and/or wireless network, e.g., a bus or the like in the vehicle 105 such as a controller area network (CAN) or the like, and/or other wired and/or wireless mechanisms.

Via the vehicle 105 communications network, the computer 110 may transmit messages to various devices in the vehicle 105 and/or receive messages from the various devices, e.g., vehicle sensors 115, actuators 120, vehicle components 125, a human machine interface (HMI), etc. Alternatively or additionally, in cases where the computer 110 actually comprises a plurality of devices, the vehicle 105 communications network may be used for communications between devices represented as the computer 110 in this disclosure. Further, as mentioned below, various controllers and/or vehicle sensors 115 may provide data to the computer 110.

Vehicle sensors 115 may include a variety of devices such as are known to provide data to the computer 110. For example, the vehicle sensors 115 may include Light Detection and Ranging (lidar) sensor(s) 115, etc., disposed on a top of the vehicle 105, behind a vehicle 105 front windshield, around the vehicle 105, etc., that provide relative locations, sizes, and shapes of objects and/or conditions surrounding the vehicle 105. As another example, one or more radar sensors 115 fixed to vehicle 105 bumpers may provide data to provide and range velocity of objects (possibly including second vehicles 106), etc., relative to the location of the vehicle 105. The vehicle sensors 115 may further include camera sensor(s) 115, e.g. front view, side view, rear view, etc., providing images from a field of view inside and/or outside the vehicle 105.

The vehicle 105 actuators 120 are implemented via circuits, chips, motors, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the computer 110 may be configured for communicating via a vehicle-to-vehicle communication module or interface 130 with devices outside of the vehicle 105, e.g., through a vehicle-to-vehicle (V2V) or vehicle-to-infrastructure (V2X) wireless communications to another vehicle, to (typically via the network 135) a remote server 145. The module 130 could include one or more mechanisms by which the computer 110 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the module 130 include cellular, Bluetooth®, IEEE 802.11, dedicated short range communications (DSRC), and/or wide area networks (WAN), including the Internet, providing data communication services.

The network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, Bluetooth Low Energy (BLE), IEEE 802.11, vehicle-to-vehicle (V2V) such as Dedicated Short-Range Communications (DSRC), etc.), local area networks (LAN) and/or wide area networks (WAN), including the Internet, providing data communication services.

A computer 110 can receive and analyze data from sensors 115 substantially continuously, periodically, and/or when instructed by a server 145, etc. Further, object classification or identification techniques can be used, e.g., in a computer 110 based on lidar sensor 115, camera sensor 115, etc., data, to identify a type of object, e.g., vehicle, person, rock, pothole, bicycle, motorcycle, etc., as well as physical features of objects.

Figure 2:
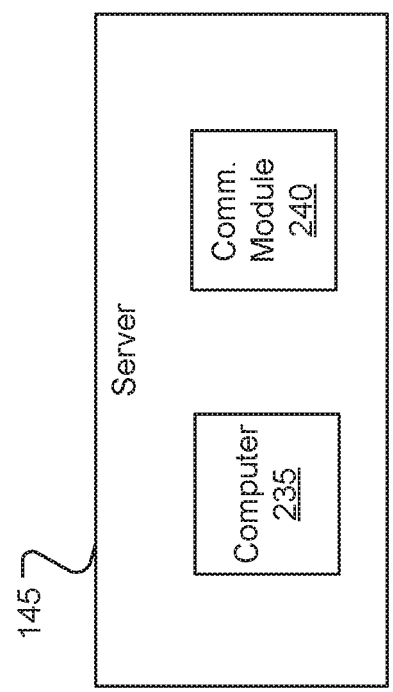
FIG. 2 is a diagram of an example server within the system.

FIG. 2 is a block diagram of an example server 145. The server 145 includes a computer 235 and a communications module 240. The computer 235 includes a processor and a memory. The memory includes one or more forms of computer-readable media, and stores instructions executable by the computer 235 for performing various operations, including as disclosed herein. The communications module 240 allows the computer 235 to communicate with other devices, such as the vehicle 105.

Figure 3:
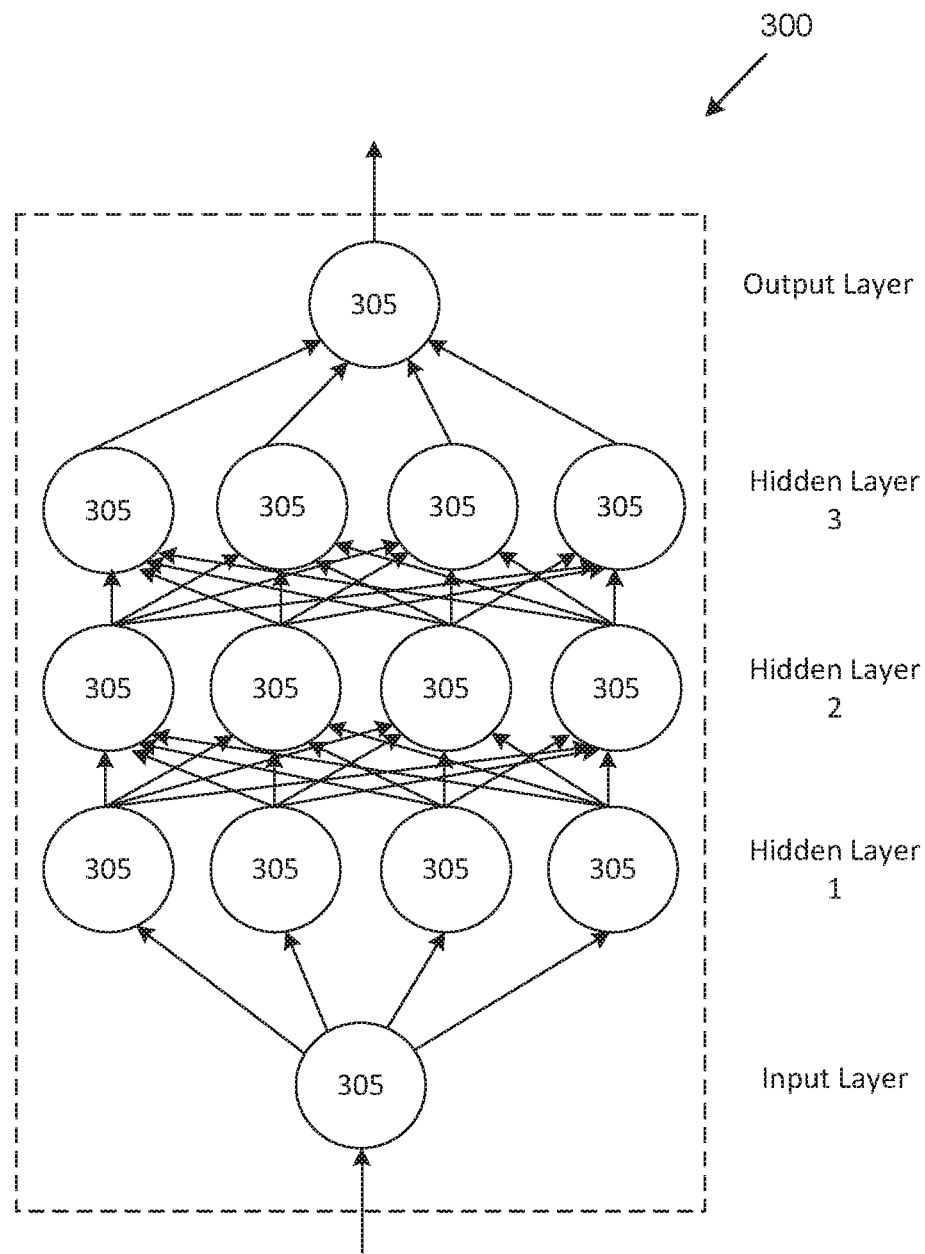
FIG. 3 is a diagram of an example deep neural network.

FIG. 3 is a diagram of an example deep neural network (DNN) 300 that may be used herein. The DNN 300 includes multiple nodes 305, and the nodes 305 are arranged so that the DNN 300 includes an input layer, one or more hidden layers, and an output layer. Each layer of the DNN 300 can include a plurality of nodes 305. While FIG. 3 illustrates three (3) hidden layers, it is understood that the DNN 300 can include additional or fewer hidden layers. The input and output layers may also include more than one (1) node 305.

The nodes 305 are sometimes referred to as artificial neurons 305, because they are designed to emulate biological, e.g., human, neurons. A set of inputs (represented by the arrows) to each neuron 305 are each multiplied by respective weights. The weighted inputs can then be summed in an input function to provide, possibly adjusted by a bias, a net input. The net input can then be provided to activation function, which in turn provides a connected neuron 305 an output. The activation function can be a variety of suitable functions, typically selected based on empirical analysis. As illustrated by the arrows in FIG. 3, neuron 305 outputs can then be provided for inclusion in a set of inputs to one or more neurons 305 in a next layer.

The DNN 300 can be trained to accept data as input and generate an output based on the input. The DNN 300 can be trained with ground truth data, i.e., data about a real-world condition or state. For example, the DNN 300 can be trained with ground truth data or updated with additional data by a processor. Weights can be initialized by using a Gaussian distribution, for example, and a bias for each node 305 can be set to zero. Training the DNN 300 can including updating weights and biases via suitable techniques such as back-propagation with optimizations. Ground truth data can include, but is not limited to, data specifying objects within an image or data specifying a physical parameter, e.g., angle, speed, distance, color, hue, or angle of object relative to another object. For example, the ground truth data may be data representing objects and object labels.

Figure 4:
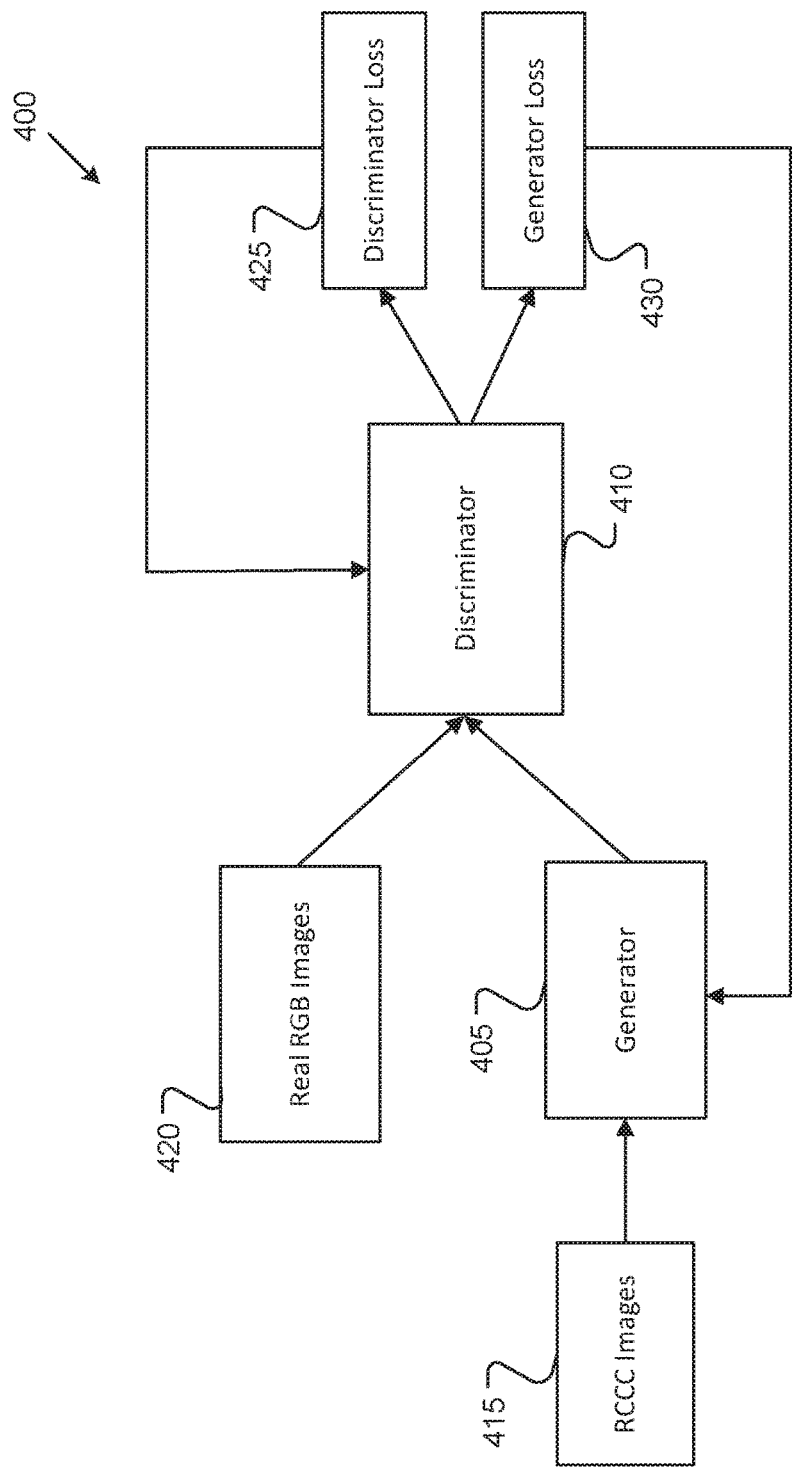
FIG. 4 is a diagram of an example adversarial neural network.

FIG. 4 is a diagram of an example adversarial neural network 400 for converting, e.g., mapping, red-clear-clear-clear (RCCC) images to red-blue-green (RGB) images. While the present disclosure describes an adversarial neural network, it is understood that the other deep neural networks may be used to generate data based on generally related datasets. The adversarial neural network 400 can be a software program that can be loaded in memory and executed by a processor in the computer 110 and/or the server 145, for example. As shown, the adversarial neural network 400 includes a generator 405 and a discriminator 410. The generator 405 and/or the discriminator 410 may comprise a DNN 300. Within the present context, the generator 405 and the discriminator 410 comprise a generative adversarial network (GAN). The GAN is a deep neural network that employs a class of artificial intelligence algorithms used in machine learning and implemented by a system of two neural networks contesting each other in an adversarial zero-sum game framework.

In an example implementation, the generator 405 receives RCCC images 415 as input. In one or more examples, the RCCC images may be images captured by camera sensors, such as the vehicle 105 sensors 115. The generator 405 generates synthetic RGB images based on the received RCCC images.

The discriminator 410 is configured to receive data, evaluate the received data, and generate a prediction indicative of whether the received image is machine-generated, e.g., generated by the generator 405, or is sourced from a real data distribution. The discriminator 410 receives synthetic, e.g., images generated by the generator, image data generated by the generator 405 and RGB image data from a real data distribution 420 during training such that the discriminator 410 can distinguish between synthetic data and data from a real data distribution. In one or more implementations, the discriminator 410 may comprise a convolutional neural network. However, it is understood that other neural networks may be used in accordance with the present disclosure.

The training of the generator 405 may use reinforcement learning to train the generative model. Reinforcement learning is a type of dynamic programming that trains algorithms using a system of reward and punishment. A reinforcement learning algorithm, or reinforcement learning agent, learns by interacting with its environment. The agent receives rewards by performing correctly and penalties for performing incorrectly. For instance, the reinforcement learning agent learns without intervention from a human by maximizing the reward and minimizing the penalty. The adversarial neural network 400 can employ a loss function to update the weights of the generator 405 and/or the discriminator 410 based on the output of the discriminator 410. In one or more implementations, the generator 405 constructs an RGB image based on the RCCC image based on a generator loss function, and the discriminator 410 distinguishes between real (e.g., original) and fake (e.g., constructed, synthetic) images based on a discriminator loss function During training, the discriminator 410 classifies both real RGB images provided from the real data distribution 420 and synthetic RGB images generated by the generator 405. The discriminator's 410 classification is used to update one or more weights of the generator 405 and/or the discriminator 410 via backpropagation. A processor of the computer 235 can calculate a discriminator loss 425 or a generator loss 430, and the calculated losses 425, 430 can be used to update the weights of the discriminator 410 or the generator 405, respectively, during training. The calculated losses 425, 430 are based on the loss function employed by the adversarial neural network 400. It is understood that the discriminator loss 425 and/or the generator loss 430 may comprise at least a portion of the respective generator or discriminator loss functions.

The generator loss 430 can be designed, as described in greater detail herein, such that (1) the generator 405 preserves a spatial relationship between objects within the RCCC image and the synthetic RGB image; (2) the generator 405 generates images having a distribution that corresponds to a distribution of an RGB image; and (3) the generator 405 minimizes the difference between the sum of luminance values of a CCCC/RCCC image to the sum of values of the corresponding RGB image.

Figure 5:
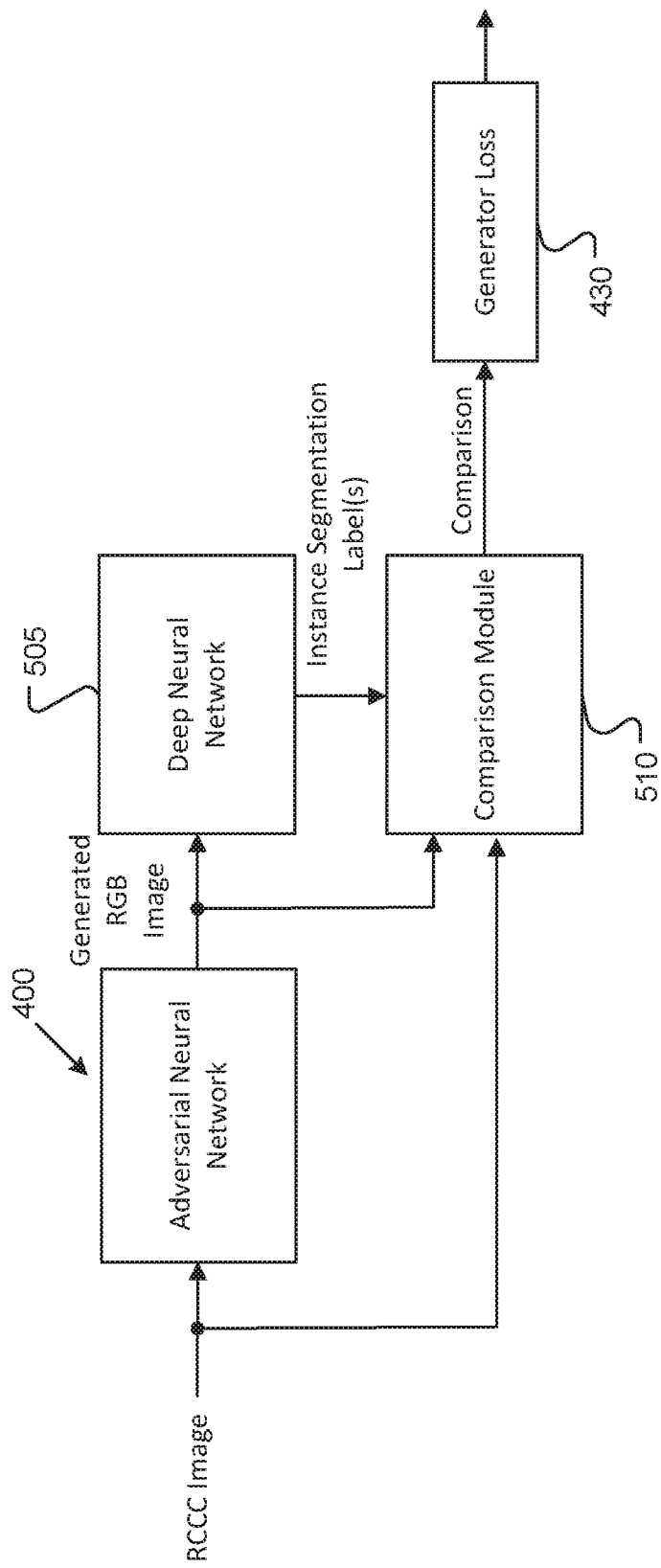
FIG. 5 is another diagram of the example adversarial neural network.

During training, objects depicted within the generated RGB image may be compared with objects depicted within the RCCC image input to the generator 405 for spatial relationship analysis. For example, as shown in FIG. 5, the generated RGB image may be provided to a deep neural network 505. The deep neural network 505 may comprise a convolutional neural network (CNN), a region CNN (R-CNN), Fast R-CNN, Faster R-CNN, or the like. The convolutional neural network 505 is configured to generate one or more instance segmentation labels based on the generated RGB image. Instance segmentation labels may be defined as labels that delineate each distinct object depicted within the image.

The generated RGB image and the corresponding instance segmentation labels may be provided to a comparison module 510. The comparison module 510 may also receive the RCCC image and corresponding instance segmentation labels. The comparison module 510 compares the instance segmentation labels of the generated RGB image with the instance segmentation labels of the RCCC image and determines a difference between the corresponding instance segmentation labels. The comparison module 510 generates comparison data that is indicative of the determined difference between the corresponding instance segmentation labels. The comparison module 510 may also determine whether the comparison data is greater than a predetermined spatial relation threshold. The spatial relation may not have been preserved when the comparison data is greater than the predetermined spatial relation threshold. For example, one or more pixels within the generated RGB image may identified as part of a different object with respect to the RCCC image. The comparison data can be provided to generator loss 430 to update the weights of the generator 405 when the comparison data is greater than the predetermined spatial relation threshold.

The spatial relationship comparison can be completed within each image and then between images. For example, if an RCCC image has two objects, such as rectangular boxes, therein with a relative orientation and distance between them, then the translated RGB image should also have two objects, e.g., the rectangular boxes, with the same relative orientation and distance between them.

The comparison module 510 may also compare a distribution of the generated RGB image with a distribution of a corresponding RGB image. The corresponding RGB image may be a real RGB image, e.g., RGB image from a real-world dataset, having the same objects depicted therein as the generated RGB image. In one or more implementations, the comparison module 510 may compare a distribution of pixels within a specific location of the generated RGB image with the distribution of pixels within the corresponding specific location of the real RGB image. Based on the comparison, the comparison module 510 generates pixel comparison data indicative of a difference between the pixel distributions. The pixel comparison data can be compared to a predetermined pixel distribution threshold and can be provided to the generator loss 430 when the pixel comparison data is greater than the pixel distribution threshold.

In some implementations, the pixel distribution of the CCCC image, e.g., the CCCC image corresponding to the RCCC image, may be compared with a pixel distribution of a grayscale version of the generated RGB image.

The comparison module 510 may also compare a luminance value of the generated RGB image with the luminance value of the RCCC image input to the adversarial neural network 400. For example, the comparison module 510 may calculate a luminance value of the generated RGB image using Equation 1:

$$Y=0.59*G+0.3*R+0.11*B, \quad \text{EQ. 1.}$$

The comparison module 510 may also convert the RCCC image to a CCCC image using suitable demosaicing techniques. The comparison module 510 compares the luminance values of the generated RGB image and the corresponding RCCC image to generate luminance difference data indicative of the differences between the luminance values. The luminance difference data is compared to a predetermined luminance difference threshold and can be provided to the generator loss 430 when the luminance difference data is compared to the predetermined luminance difference threshold.

In some implementations, the RCCC image is converted to a CCCC image. The CCCC image can comprise the luminance values of the RCCC image. The generated RGB image can be converted to a luminance image via EQ. 1 that comprises the luminance values of the RGB image. The comparison module 510 can compare the luminance values by taking the sum of the luminance values in the RCCC image and comparing that sum to a sum of luminance values of the generated RGB image such that the difference between the sums can be minimized.

By constraining the generator loss 430 based on the spatial relationship between objects within the RGB images, the distribution of the RGB images, and the luminance values of the RGB images, the generator loss 430 can be used by the generator 405 such that the generator 405 may ensure that the visual scene of the input image does not change—only the representation of the color information. The predetermined pixel distribution threshold, the predetermined spatial relation threshold, and/or the predetermined luminance difference threshold may be selected based on empirical analysis associated with the training of adversarial networks.

Figure 6:
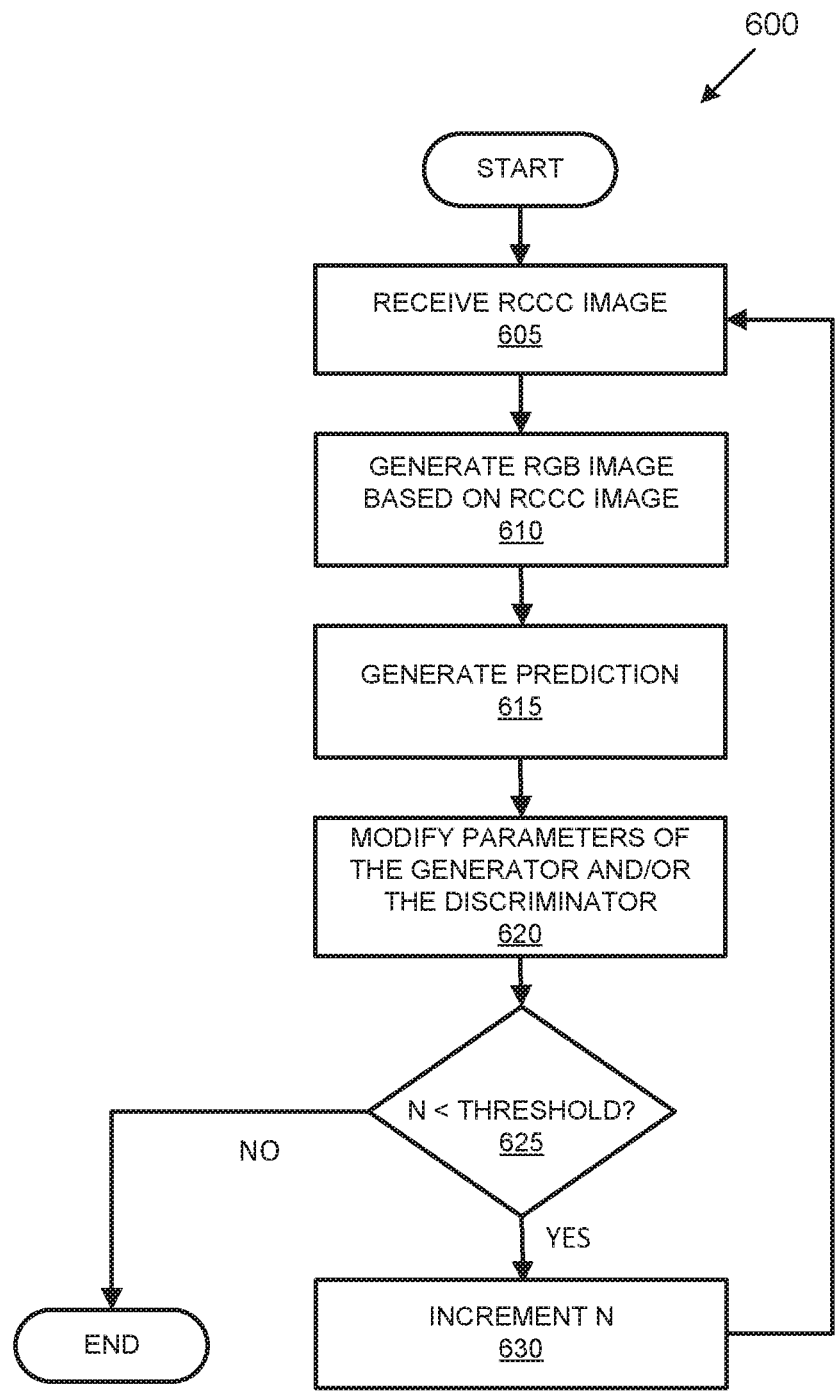
FIG. 6 is a flow diagram illustrating an example process for training an adversarial neural network.

FIG. 6 is a flowchart of an exemplary process 600 for training a generator within an adversarial neural network. Blocks of the process 600 can be executed by the computer 110 or the computer 235. The process 600 begins at block 605 in which an image is received. In an example implementation, the generator 405 receives a RCCC image. At block 610, the generator 405 generates a synthetic RGB image, e.g., machine-generated image, based on the RCCC image. In one or more implementations, the generator 405 attempts to generate a photorealistic synthetic RGB image based on the received RCCC image.

At block 615, the discriminator 310 generates a prediction indicative of whether the received synthetic image is from the real data distribution or machine-generated. At block 620, parameters of the discriminator 410 and/or the generator 405 are modified based on the prediction. For example, as described above, the prediction is used to modify one or more weights of the adversarial neural network 400. For example, one or more weights of the generator 405 and/or the discriminator 410 are updated using backpropagation based on the discriminator loss 425 and/or the generator loss 430.

At block 625, a determination whether a counter N is less than a predetermined training threshold. If the counter N is less than the predetermined training threshold, the counter N is incremented at block 630 and the process 600 returns to block 605 to further train the discriminator 410. Otherwise, the process 600 ends. The predetermined training threshold may be selected based on empirical analysis associated with the training of adversarial networks. Once trained, the generator 405 is configured to generate RGB images based on RCCC images. The generated RGB images can be used within vehicle perception systems. For example, the generated RGB images can be used to train vehicle perception systems.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system comprising a computer including a processor and a memory, the memory including instructions such that the processor is programmed to:
   receive, at a deep neural network, an image having a Red-Clear-Clear-Clear (RCCC) image pattern, wherein the deep neural network includes a generator and a discriminator;
   generate, at the generator, a Red-Green-Blue (RGB) image based on the image having the RCCC image pattern;
   determine, at the discriminator, whether the RGB image is machine-generated or is sourced from the real data distribution; and
   update at least one weight of the generator when the discriminator determines the RGB image is machine-generated.

2. The system of claim 1, wherein the at least one weight is updated based on a spatial relationship comparison between the image having the RCCC image pattern and the generated RGB image.

3. The system of claim 2, wherein the processor is further programmed to generate a plurality of instance segmentation labels based on the image having the RCCC image pattern and generate a plurality of instance segmentation labels based on the generated RGB image.

4. The system of claim 3, wherein the processor is further programmed to:
   compare at least one instance segmentation label of the plurality of instance segmentation labels of the image having the RCCC image pattern to at least one instance segmentation label of the plurality of instance segmentation labels of the generated RGB image; and
   determine a difference at least one instance segmentation label of the RCCC image and the at least one instance segmentation label of the RGB image.

5. The system of claim 4, wherein the processor is further programmed to update the at least one weight when the difference is greater than a predetermined spatial relation threshold.

6. The system of claim 1, wherein the at least one weight is updated based on a comparison of a pixel distribution corresponding to the image having the RCCC image pattern to a pixel distribution of a grayscale image corresponding to the generated RGB image.

7. The system of claim 1, wherein the at least one weight is updated based on a comparison of a luminance value corresponding to the image having the RCCC image pattern to a luminance value corresponding to the generated RGB image.

8. A system comprising a computer including a processor and a memory, the memory including instructions such that the processor is programmed to:

receive, at a deep neural network, an image having a Red-Clear-Clear-Clear (RCCC) image pattern, wherein the deep neural network includes a generator and a discriminator;

generate, at the generator, a Red-Green-Blue (RGB) image based on the image having the RCCC image pattern;

determine, at the discriminator, whether the RGB image is machine-generated or is sourced from the real data distribution; and update at least one weight of the generator when the discriminator determines the RGB image is machine-generated, wherein the at least one weight is updated based on a spatial relationship comparison between the image having the RCCC image pattern and the generated RGB image.

9. The system of claim 8, wherein the processor is further programmed to generate a plurality of instance segmentation labels based on the image having the RCCC image pattern and generate a plurality of instance segmentation labels based on the generated RGB image.

10. The system of claim 9, wherein the processor is further programmed to:

compare at least one instance segmentation label of the plurality of instance segmentation labels of the image having the RCCC image pattern to at least one instance segmentation label of the plurality of instance segmentation labels of the generated RGB image; and determine a difference at least one instance segmentation label of the image having the RCCC image pattern and the at least one instance segmentation label of the RGB image.

11. The system of claim 10, wherein the processor is further programmed to update the at least one weight when the difference is greater than a predetermined spatial relation threshold.

12. The system of claim 8, wherein the at least one weight is updated based on a comparison of a pixel distribution corresponding to the image having the RCCC image pattern to a pixel distribution of a grayscale image corresponding to the generated RGB image.

13. The system of claim 8, wherein the at least one weight is updated based on a comparison of a luminance value corresponding to the image having the RCCC image pattern to a luminance value corresponding to the generated RGB image.

14. The system of claim 8, wherein the at least one weight is updated based on a comparison of a pixel distribution corresponding to the image having the RCCC image pattern to a pixel distribution of a RGB image included in a real-world dataset.

15. A method comprising:

receiving, at a deep neural network, an image having a Red-Clear-Clear-Clear (RCCC) image pattern, wherein the deep neural network includes a generator and a discriminator;

generating, at the generator, a Red-Green-Blue (RGB) image based on the image having the RCCC image pattern;

determining, at the discriminator, whether the RGB image is machine-generated or is sourced from the real data distribution; and updating at least one weight of the generator when the discriminator determines the RGB image is machine-generated.

16. The method of claim 15, wherein the at least one weight is updated based on a spatial relationship comparison between the RCCC image and the generated RGB image.

17. The method of claim 16, further comprising generating a plurality of instance segmentation labels based on the image having the RCCC image pattern and generate a plurality of instance segmentation labels based on the generated RGB image.

18. The method of claim 17, further comprising:

comparing at least one instance segmentation label of the plurality of instance segmentation labels of the image having the RCCC image pattern to at least one instance segmentation label of the plurality of instance segmentation labels of the generated RGB image; and determining a difference at least one instance segmentation label of the RCCC image and the at least one instance segmentation label of the RGB image.

19. The method of claim 15, wherein the at least one weight is updated based on a comparison of a pixel distribution corresponding to the image having the RCCC image pattern to a pixel distribution of a grayscale image corresponding to the generated RGB image.

20. The method of claim 15, wherein the at least one weight is updated based on a comparison of a luminance value corresponding to the image having the RCCC image pattern to a luminance value corresponding to the generated RGB image.

* * * * *